(12) United States Patent
Barsness et al.

(10) Patent No.: US 10,338,989 B2
(45) Date of Patent: *Jul. 2, 2019

(54) DATA TUPLE TESTING AND ROUTING FOR A STREAMING APPLICATION

(71) Applicant: International Business Machines Corporation, Armonk, NY (US)

(72) Inventors: Eric L. Barsness, Pine Island, MN (US); Michael J. Branson, Rochester, MN (US); Alexander Cook, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/404,190

(22) Filed: Jan. 11, 2017

(65) Prior Publication Data
US 2017/0262326 A1    Sep. 14, 2017

Related U.S. Application Data

(63) Continuation of application No. 15/064,798, filed on Mar. 9, 2016, now Pat. No. 9,600,406.

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0721* (2013.01); *G06F 11/3688* (2013.01);
(Continued)

(58) Field of Classification Search
CPC ............. G06F 11/3696; G06F 11/3664; G06F 11/3668; G06F 11/3672; G06F 11/3688
See application file for complete search history.

(56) References Cited

U.S. PATENT DOCUMENTS 6,134,690 A  10/2000  Ivaturi et al.
9,020,785 B2  4/2015  Branson et al.
(Continued)

OTHER PUBLICATIONS

Barsness et al., "Data Tuple Testing and Routing for a Streaming Application" U.S. Appl. No. 15/064,798, filed Mar. 9, 2016.
(Continued)

*Primary Examiner* — Philip Guyton
(74) *Attorney, Agent, or Firm* — Martin & Associates, LLC; Derek P. Martin

(57) ABSTRACT

A tuple testing and routing operator in a streaming application routes data tuples to multiple parallel test operators that test in parallel the data tuples, receives feedback from the multiple parallel test operators regarding the results of testing the data tuples, routes a data tuple to a first operator when the data tuple passes the multiple parallel test operators according to a specified pass threshold, and optionally routes the data tuple to a second operator when the data tuple does not pass the multiple parallel test operators according to the specified pass threshold. The pass threshold allows testing to be done in a way that does not require all tests to be performed for all data tuples, thereby enhancing performance.

18 Claims, 10 Drawing Sheets

(51) Int. Cl.
*G06F 11/36* (2006.01)
*G06F 16/2452* (2019.01)
*G06F 16/2453* (2019.01)
*G06F 16/2455* (2019.01)

(52) U.S. Cl.
CPC ...... *G06F 11/3692* (2013.01); *G06F 11/3696* (2013.01); *G06F 16/24524* (2019.01); *G06F 16/24532* (2019.01); *G06F 16/24568* (2019.01)

(56) References Cited

U.S. PATENT DOCUMENTS

| | | | |
|---|---|---|---|
| 9,600,406 | B1 * | 3/2017 | Barsness ............. G06F 11/3696 |
| 2011/0213802 | A1 | 9/2011 | Singh et al. |
| 2014/0164628 | A1 | 6/2014 | Branson et al. |

OTHER PUBLICATIONS

Appendix P—List of IBM Patents or Patent Applications Treated As Related, dated Mar. 1, 2017.

* cited by examiner

| # Test Operators | Batch Size | Routing Method | Pass Threshold |
|---|---|---|---|
| 4 | 8 | 1 per 2 operators | 50% |

| Batch | B | C | D | E |
|---|---|---|---|---|
| T1 | | | | |
| T2 | | | | |
| T3 | | | | |
| T4 | | | | |
| T5 | | | | |
| T6 | | | | |
| T7 | | | | |
| T8 | | | | |

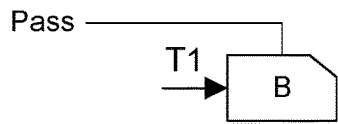
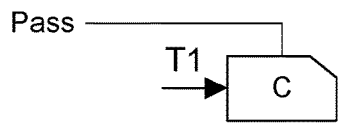
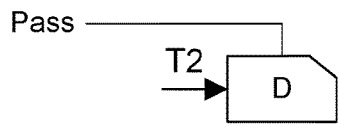
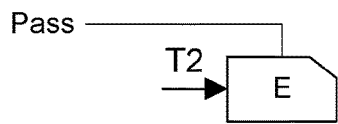
FIG. 9
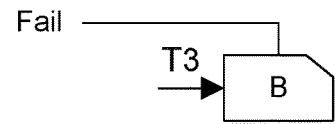
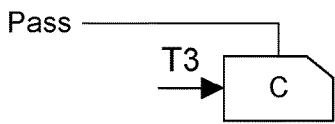
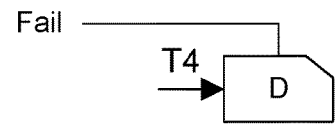
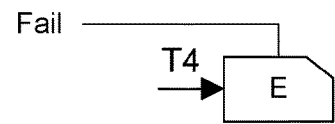
FIG. 10
| Batch | B | C | D | E |
|---|---|---|---|---|
| T1 | Pass | Pass | X | X |
| T2 | X | X | Pass | Pass |
| T3 | Fail | Pass | | |
| T4 | | | Fail | Fail |
| T5 | | | | |
| T6 | | | | |
| T7 | | | | |
| T8 | | | | |
FIG. 11

| Batch | B | C | D | E |
|---|---|---|---|---|
| T1 | Pass | Pass | X | X |
| T2 | X | X | Pass | Pass |
| T3 | Fail | Pass | Fail | Pass |
| T4 | Pass | Fail | Fail | Fail |
| T5 | | | | |
| T6 | | | | |
| T7 | | | | |
| T8 | | | | |

1300

| # Test Operators | Batch Size | Routing Method | Pass Threshold |
|---|---|---|---|
| 4 | 8 | 1 per operator | 50% |

| Batch | B | C | D | E |
|---|---|---|---|---|
| T1 | Pass | | | |
| T2 | | Fail | | |
| T3 | | | Pass | |
| T4 | | | | Pass |
| T5 | | | | |
| T6 | | | | |
| T7 | | | | |
| T8 | | | | |

| Batch | B | C | D | E |
|---|---|---|---|---|
| T1 | Pass | Pass | X | X |
| T2 | | Fail | Fail | |
| T3 | | | Pass | Fail |
| T4 | | | | Pass |
| T5 | Pass | | | |
| T6 | | | | |
| T7 | | | | |
| T8 | | | | |

| Batch | B | C | D | E |
|---|---|---|---|---|
| T1 | Pass | Pass | X | X |
| T2 | X | Fail | Fail | Fail |
| T3 | Pass | X | Pass | Fail |
| T4 | X | Pass | X | Pass |
| T5 | Pass | | Fail | |
| T6 | | | | |
| T7 | | | | |
| T8 | | | | |

2000

DATA TUPLE TESTING AND ROUTING FOR A STREAMING APPLICATION

BACKGROUND

1. Technical Field

This disclosure generally relates to streaming applications, and more specifically relates to the testing and routing of data tuples in a streaming application.

2. Background Art

Streaming applications are known in the art, and typically include multiple operators coupled together in a flow graph that process streaming data in near real-time. An operator typically takes in streaming data in the form of data tuples, operates on the data tuples in some fashion, and outputs the processed data tuples to the next operator. Streaming applications are becoming more common due to the high performance that can be achieved from near real-time processing of streaming data.

Some streaming applications need to test all data tuples using one or more test operators, and route the data tuples to different operators based on the results of the test operators. When many tests need to be performed, serializing the tests results in longer latency in processing the data tuples. Placing the tests in parallel can improve performance, but still results in running all data tuples through all tests.

BRIEF SUMMARY

A tuple testing and routing operator in a streaming application routes data tuples to multiple parallel test operators that test in parallel the data tuples, receives feedback from the multiple parallel test operators regarding the results of testing the data tuples, routes a data tuple to a first operator when the data tuple passes the multiple parallel test operators according to a specified pass threshold, and optionally routes the data tuple to a second operator when the data tuple does not pass the multiple parallel test operators according to the specified pass threshold. The pass threshold allows testing to be done in a way that does not require all tests to be performed for all data tuples, thereby enhancing performance.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 9 is a partial flow diagram showing the testing of data tuples T1 and T2 using the four parallel operators shown in FIG. 4;

FIG. 10 is a partial flow diagram showing the testing of data tuples T3 and T4 using the four parallel operators shown in FIG. 4;

FIG. 11 is a table similar to the table in FIG. 7 after results of testing data tuples T1, T2, T3 and T4 in FIGS. 9 and 10 have been compiled;

DETAILED DESCRIPTION

The disclosure and claims herein are directed to a tuple testing and routing operator in a streaming application that routes data tuples to multiple parallel test operators that test in parallel the data tuples, receives feedback from the multiple parallel test operators regarding the results of testing the data tuples, routes a data tuple to a first operator when the data tuple passes the multiple parallel test operators according to a specified pass threshold, and optionally routes the data tuple to a second operator when the data tuple does not pass the multiple parallel test operators according to the specified pass threshold. The pass threshold allows testing to be done in a way that does not require all tests to be performed for all data tuples, thereby enhancing performance.

Figure 1:
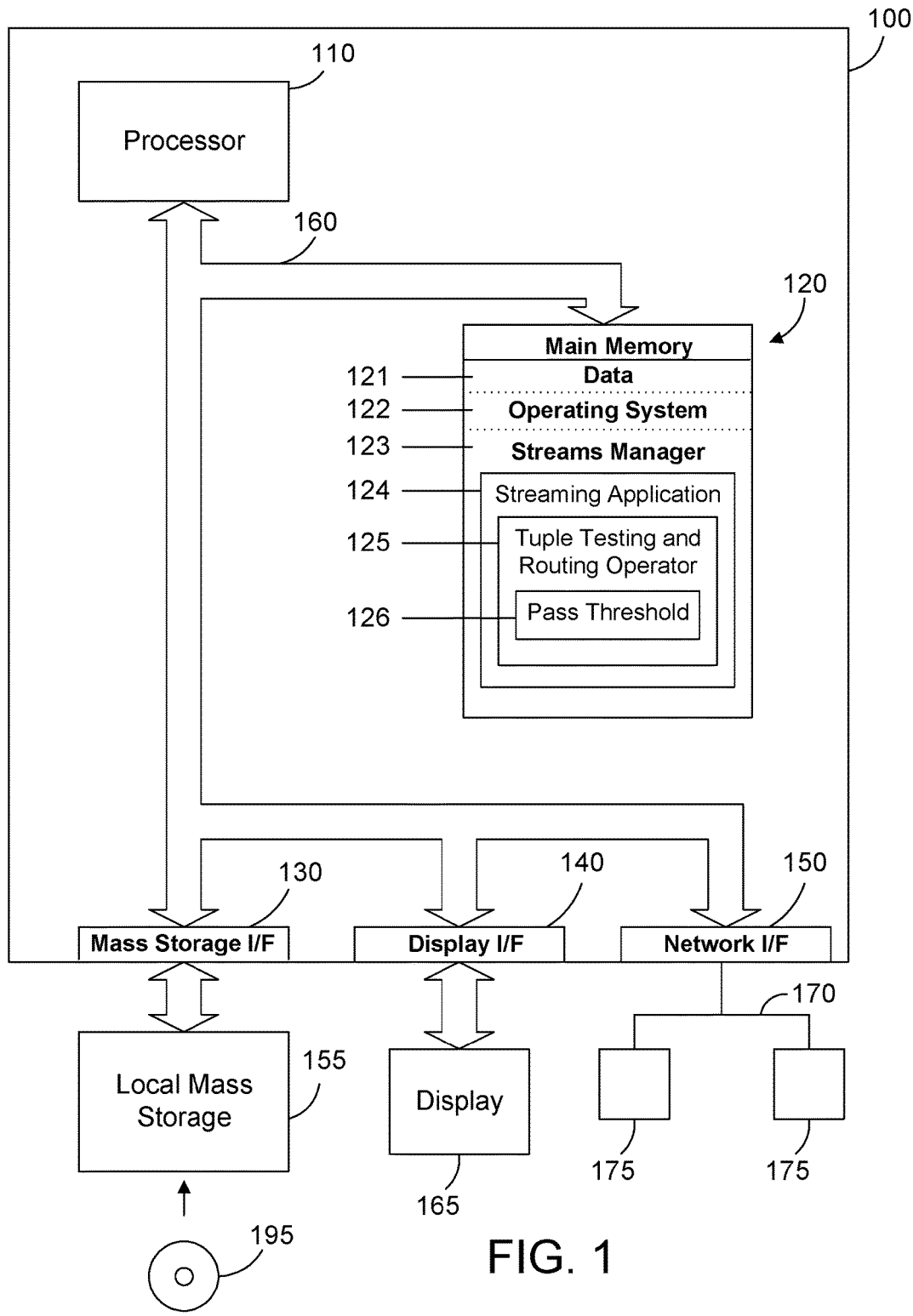
FIG. 1 is a block diagram of a computer system that includes a tuple testing and routing operator that tests data tuples using multiple parallel operators and routes the data tuples to different operators depending on the results of the tests according to a specified pass threshold.

Referring to FIG. 1, a computer system 100 is one suitable implementation of a server computer system that includes a multiple connection export operator as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a runtime environment that executes a streaming application 124. The streaming application 124 comprises a flow graph that includes processing elements that include operators that process data tuples. The streaming application 124 includes a tuple testing and routing operator 125 that routes data tuples to multiple parallel test operators that test in parallel data tuples, receives feedback from the multiple parallel test operators regarding the results of testing the data tuples, routes a data tuple to a first operator when the data tuple passes the multiple parallel test operators according to a specified pass threshold 126, and routes the data tuple to a second operator when the data tuple does not pass the multiple parallel test operators according to the specified pass threshold 126, as discussed in more detail below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and streams manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124, which includes the multiple connection export operator 126.

Although computer system 100 is shown to contain only a single processor and a single system bus, those skilled in the art will appreciate that tuple testing and routing operator in a streaming application as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
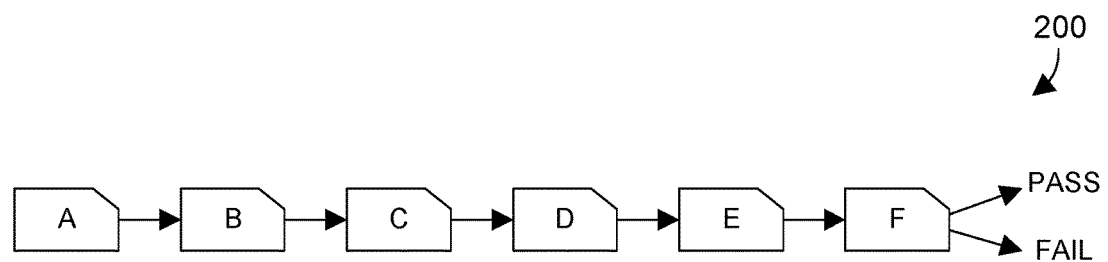
FIG. 2 is a block diagram of a sample streaming application that tests data tuples using multiple serial testing operators and outputs the data tuples to different operators depending on the results of the tests.

Referring to FIG. 2, an extremely simplified streaming application 200 is shown. The streaming application 200 includes six operators A, B, C, D, E and F, and two paths labeled PASS and FAIL that lead to one or more other operators not shown in FIG. 2. Operator A produces data tuples that are sent to operator B. Operator B performs a test on the data tuples and passes them on to operator C. Operator C performs a test on the data tuples and passes them on to operator D. Operator D performs a test on the data tuples and passes them on to operator E. Operator E performs a test on the data tuples and passes them on to operator F. Operator F then reviews the results of the tests performed in operators B, C, D and E, and determines whether a data tuples passes all of these tests. If a data tuple passes all of the tests in operators B, C, D and E, the data tuple is routed by operator F on a path labeled PASS in FIG. 2 to some downstream operator for further processing. If a data tuple does not pass all of the tests in operators B, C, D and E, the tuple is routed on a path labeled FAIL in FIG. 2 to some downstream operator for further processing.

Figure 3:
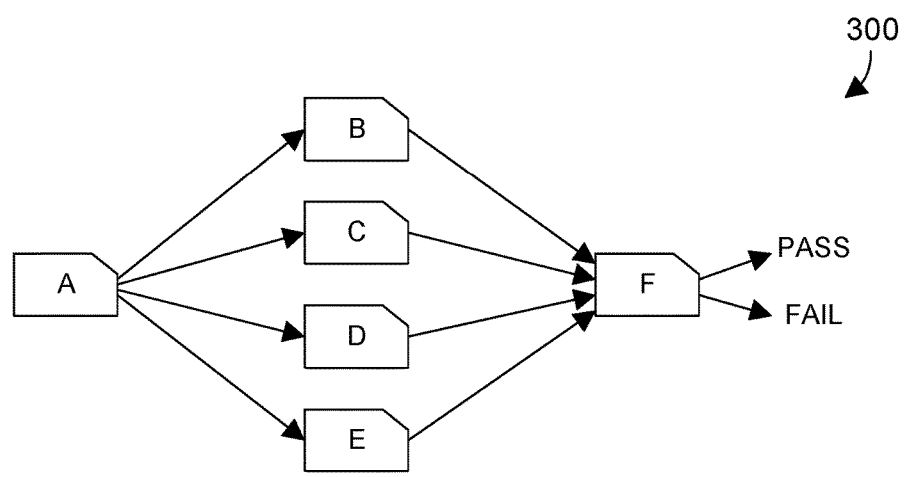
FIG. 3 is a block diagram of a streaming application that tests data tuples using multiple parallel testing operators and may output the data tuples to different operators depending on the results of the tests.

The serialization of the tests in operators B, C, D and E as shown in FIG. 2 can result in considerable time delay before operator F routes a data tuple to the next operator on the PASS path or the next operator on the FAIL path. It would improve performance if these tests could be performed in parallel. Referring to FIG. 3, a streaming application 300 is shown that includes the same originating operator A and the same operator F that determines the results of the test in operators B, C, D and E, and routes data tuples to an operator on the PASS path or to an operator on the FAIL path depending on the results of the tests in operators B, C, D and E. The difference in application 300 in FIG. 3 when compared to application 200 in FIG. 2 is the testing in operators B, C, D and E is performed in parallel. This means a data tuple is routed by operator A to all four operators B, C, D and E, which then test the data tuple and provide the test results to operator F. When a data tuple passes all four tests in operators B, C, D and E, operator F forwards the data tuple to a downstream operator on the PASS path. When a data tuple does not pass all four tests in operators B, C, D and E, operator F forwards the data tuple to a downstream operator on the FAIL path. While the streaming application 300 in FIG. 3 has improved performance when compared to application 200 in FIG. 2 due to performing the testing in operators B, C, D and E in parallel, both applications 200 and 300 perform all tests in operators B, C, D and E on each and every data tuple.

There may be some situations where multiple tests are performed on a data tuple, but a data tuple need not pass all of the tests to pass. For example, let's assume data tuples from a video stream are being processed, and if a data tuple passes half or more of the tests being performed, the data tuple is deemed to have passed and is passed to a downstream operator on a PASS path, and if a data tuple does not pass half or more of the tests being performed, the data tuple is deemed to have failed and may be discarded or passed to a downstream operator on a FAIL path. While this functionality could be incorporated into operator F in FIG. 3, the application 300 would still require testing each data tuple using all operators B, C, D and E.

Figure 4:
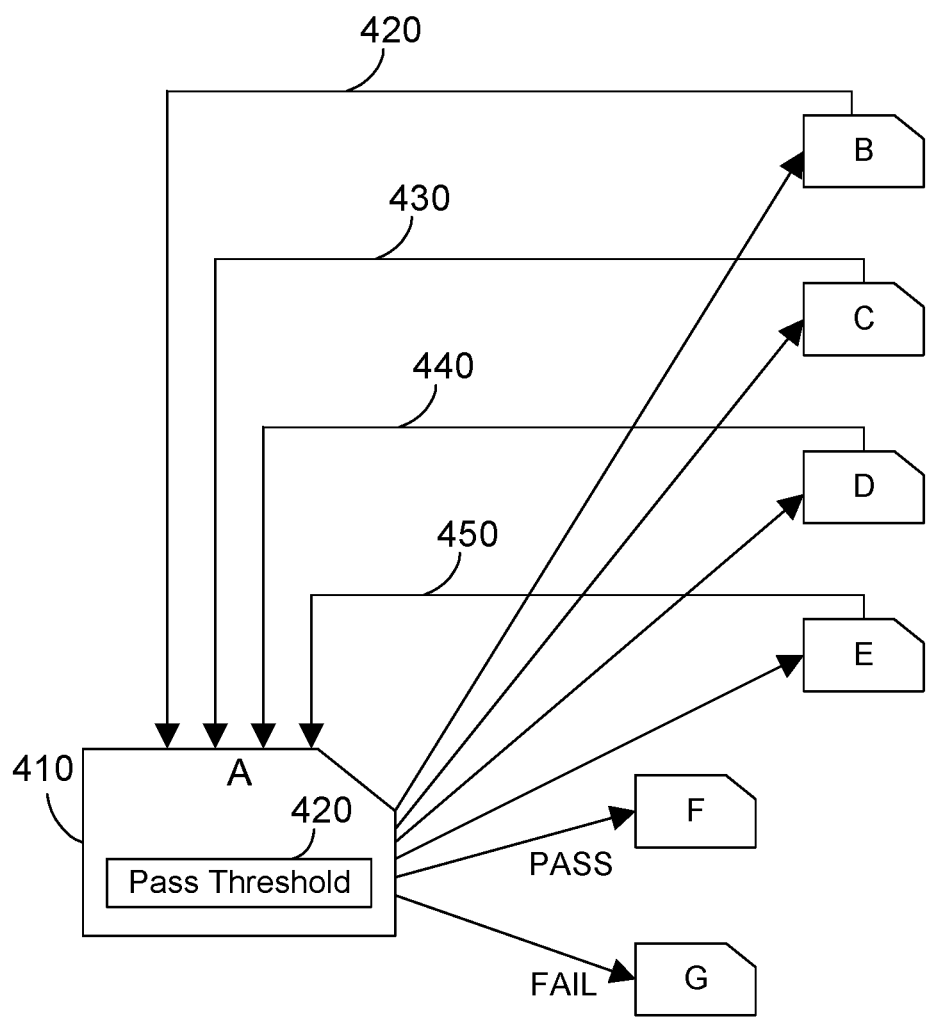
FIG. 4 is a block diagram of a tuple testing and routing operator in a streaming application that tests data tuples using multiple parallel testing operators according to a specified pass threshold and outputs the data tuples to different operators depending on the results of the tests without performing all tests on all data tuples.

The disclosure and claims herein provide a tuple testing and routing operator that operates according to a specified pass threshold, and does not have to perform all tests on all data tuples. Referring to FIG. 4, a tuple testing and routing operator 410 that operates according to a specified pass threshold 420 is one suitable example for tuple testing and routing operator 125 in FIG. 1 that operators according to the specified pass threshold 126. Operator A 410 routes data tuples to test operators B, C, D and E, which perform their testing in parallel. We assume each operator B, C, D and E returns a Boolean value that indicates whether the data tuple that was processed passed or failed the test. The tuple testing and routing operator 410 routes data tuples to multiple parallel test operators B, C, D and E that test in parallel the data tuples. Each test operator includes a feedback signal to indicate the results of the test. Thus, operator B includes a feedback signal 420 to the tuple testing and routing operator 410; operator C includes a feedback signal 430 to the tuple testing and routing operator 410; operator D includes a feedback signal 440 to the tuple testing and routing operator 410; and operator E includes a feedback signal 450 to the tuple testing and routing operator 410. The feedback signal from a testing operator to the tuple testing and routing operator not only notifies of the test results, but additionally indicates the operator has completed the testing and is ready for the next data tuple. The tuple testing and routing operator 410 then compares the test results for a data tuple to the pass threshold 420, and in many cases the determination of whether a data tuple passes or fails can be made without all of the testing operators B, C, D and E testing the data tuple. When a data tuple passes the required number of tests according to the pass threshold 420, the data tuple is passed to a downstream operator F along a PASS path. When a data tuple does not pass the required number of tests according to the pass threshold 420, the tuple testing and routing operator 410 may discard the data tuple, or may optionally pass the data tuple to a downstream operator G along a FAIL path, as shown in FIG. 4. In this example, the F operator could be deemed a "pass operator" and the G operator could be deemed a "fail operator." Note the PASS and FAIL paths could each includes multiple operators that are not shown in FIG. 4. By providing testing using multiple parallel test operators, and by specifying a pass threshold, the tuple testing and routing operator can in many cases determine when a data tuple passes or fails without all of the parallel test operators processing the data tuple, thereby enhancing performance.

Figures 5, 6, 7:
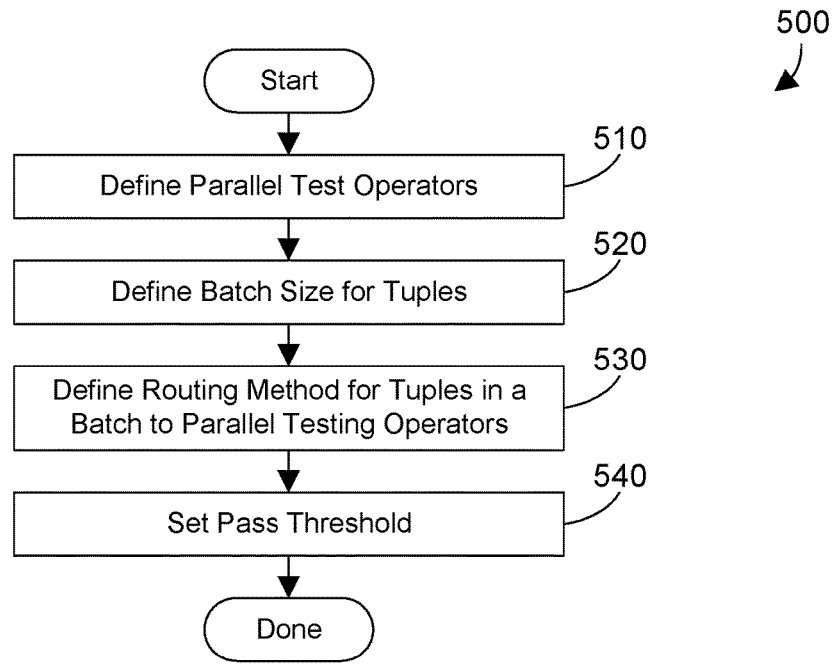
FIG. 5 is a flow diagram of a method for setting up testing of data tuples using multiple parallel operators by a tuple testing and routing operator according to a specified pass threshold.
FIG. 6 is a table showing specified parameters that govern the function of the tuple testing and routing operator.
FIG. 7 is a table in which results of the testing by the multiple test operators shown in FIG. 4 are compiled for eight data tuples in a batch.

The tuple testing and routing operator functions according to defined parameters. FIG. 5 shows a flow diagram of a method 500 for defining parameters for the tuple testing and routing operator. A suitable number of parallel test operators are defined (step 510). For the simple example in FIG. 4, a determination is made that four parallel test operators are needed, and these four operators B, C, D and E as shown in FIG. 4 are defined. Next, a batch size for data tuples is defined (step 520). A routing method for the data tuples in a batch is then defined (step 530). The pass threshold is set (step 540). Once method 500 has setup the parameters, the tuple testing and routing operator can perform its functions.

Referring to FIG. 6, a table 600 shows the parameters that could apply to the tuple testing and routing operator 410 shown in FIG. 4. For the specific example in FIG. 6, the number of parallel test operators is four, the batch size is eight data tuples, the routing method is one tuple per two operators, and the pass threshold is 50%. The pass threshold, as shown in FIG. 6, specifies a percentage that must be met or exceeded for a data tuple to pass the multiple parallel test operators. We assume the parameters in FIG. 6 are defined for the tuple testing and routing operator 410 in FIG. 4. As the tuple testing and routing operator 410 tests data tuples using the parallel test operators, the results are compiled into a table such as table 700 shown in FIG. 7.

Figure 8:
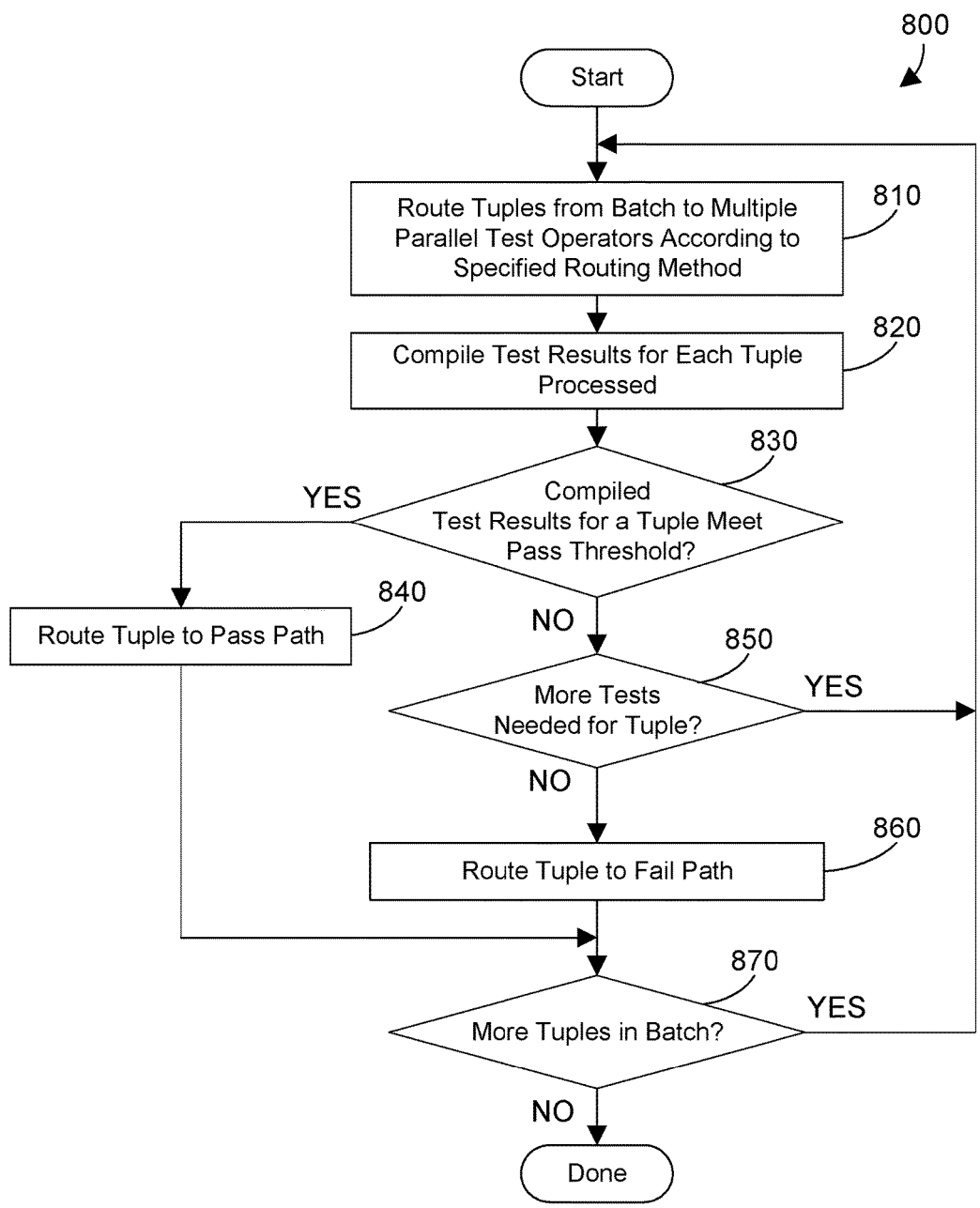
FIG. 8 is a flow diagram of a method for the tuple testing and routing operator to test data tuples using parallel test operators according to a specified pass threshold and for routing the data tuples according to the results from the parallel test operators.

Referring to FIG. 8, a method 800 represents functions performed by the tuple testing and routing operator, such as 125 in FIGS. 1 and 410 in FIG. 4. Data tuples from a batch are routed to the multiple parallel test operators according to the specified routing method (step 810). The test results are compiled for each data tuple processed (step 820), such as using a table like table 700 in FIG. 7. This is preferably done by logging the test results received on the feedback paths from the multiple parallel testing operators. When the compiled test results for a data tuple meet the specified pass threshold (step 830=YES), the data tuple is routed to the PASS path (step 840). When the compiled test results for a data tuple do not meet the pass threshold (step 830=NO), when more tests are needed for the data tuple in order to determine whether the pass threshold is met or not (step 850=YES), method 800 loops back to step 810 and continues. When no more tests are needed for the data tuple (step 850=NO), the data tuple is routed to the fail path (step 860). When there are more data tuples in the batch (step 870=YES), method 800 loops back to step 810 until there are no more data tuples in the batch (step 870=NO), at which time method 800 is done.

Two simple examples are now presented to illustrate the function of the tuple testing and routing operator 410 in the configuration shown in FIG. 4. We assume the parameters in table 600 in FIG. 6 are defined for the tuple testing and routing operator 410. FIGS. 9 and 10 show a portion of the flow diagram in FIG. 4 showing the multiple parallel testing operators B, C, D and E, and the results that are returned on the feedback path when testing specified data tuples. We assume a table 700 is created that specifies the eight data tuples T1-T8 in the batch, along with columns for each of the parallel testing operators to indicate test results of the data tuples they process. Because the routing method in FIG. 6 is one per two operators, this means each data tuple will be sent to two of the four testing operators at a time. Using this routing method, the tuple testing and routing operator 410 sends data tuple T1 to operators B and C, and sends data tuple T2 to operators D and E, as shown in FIG. 9. We assume for this example all four of these tests passed, as shown in FIG. 9. As a result, the two passes for T1 for operators B and C are logged in the table, and the two passes for T2 for operators D and E are logged in the table, as shown in table 1100 in FIG. 11. With a pass threshold of 50%, this means both data tuples T1 and T2 pass according to the pass threshold without having to perform the tests of these data tuples by the other parallel test operators. Table 1100 shown in FIG. 11 includes an "X" in the columns that indicate which tests did not need to be performed. Because the tuple testing and routing operator 410 detects data tuples T1 and T2 have passed without performing half of the tests, both data tuples T1 and T2 are routed on the PASS operator F shown in FIG. 4.

Referring to FIG. 10, the tuple testing and routing operator 410 then routes data tuple T3 to operators B and C, and routes data tuple T4 to operators D and E, with the results shown in FIG. 10. These results are logged in table 1100 in FIG. 11. Note the test results for T3 and T4 shown in FIG. 11 do not yet give enough information to know whether or not data tuples T3 and T4 have passed or not. If data tuple T3 passes one or both of the tests in operators D and E, data tuple T3 will pass. If data tuple T3 fails both of the tests in operators D and E, data tuple T3 will fail. If data tuple T4 passes both of the tests in operators B and C, data tuple T4 will pass. If data tuple T4 fails one or both of the tests in operators B and C, data tuple T4 will fail. Because the results for data tuples T3 and T4 shown in FIG. 11 do not allow determining a pass or fail according to the 50% pass threshold, more testing of T3 and T4 are needed, as shown in step 850=YES in FIG. 8.

Figures 12, 13:
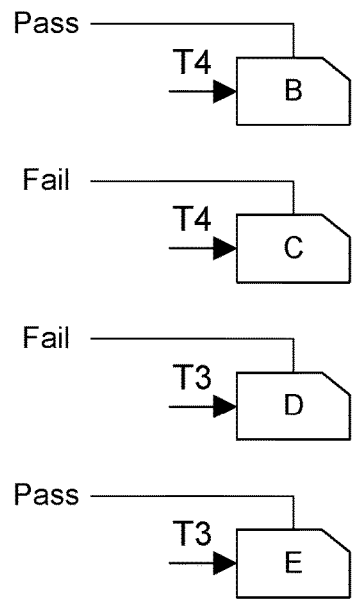
FIG. 12 is a partial flow diagram showing the testing of data tuples T3 and T4 using the four parallel operators shown in FIG. 4.
FIG. 13 is the table shown in FIG. 11 after the results of the testing in FIG. 12 have been compiled.

FIG. 12 shows the tuple testing and routing operator 410 routes data tuple T4 to operators B and C, and routes data tuple T3 to operators D and E, with the results as shown in FIG. 12. These results are compiled into the results table, as shown in table 1300 in FIG. 13. We see from the test results in table 1300 that data tuple T3 passes because it has met the 50% pass threshold, while data tuple T4 has failed because it did not meet the 50% pass threshold. The tuple testing and routing operator 410 will thus route data tuple T3 to the PASS operator F, and will discard data tuple T4 or route data tuple T4 to the FAIL operator G. The tuple testing and routing operator will then continue processing data tuples T5-T8 in similar fashion, performing only those tests needed to come to a conclusion regarding whether a data tuple satisfies the pass threshold, which in some cases means less than all of the tests are performed for a particular data tuple, and sending the data tuples to the PASS operator F or the FAIL operator G (or discard a failed data tuple) once a determination can be made of whether a data tuple satisfies the pass threshold, even when less than all of the tests have been performed for each data tuple.

There is a timing issue that is not represented well in FIG. 13. Let's assume, for example, that operator D takes a very long time to perform its test, while operator E can perform its test in a fraction of the time it takes operator D to perform its test. This means operator E will feed back its test results long before operator D. As shown by the test results in FIG. 12 and compiled in table 1300 in FIG. 13, once the tuple testing and routing operator 410 receives a pass indication from operator E for data tuple T3, data tuple T3 satisfies the pass threshold of 50% regardless of the result of the test in operator D. This allows the tuple testing and routing operator 410 to direct operator D to abort its processing of data tuple T3, and to send data tuple T3 to the PASS operator F. The tuple testing and routing operator uses the information compiled in the results table to determine when a data tuple does or does not satisfy the pass threshold. When the answer is clear from the testing already performed, the data tuple can be routed to the appropriate PASS or FAIL operators, or may be discarded if the data tuple failed, and the tuple testing and routing operator 410 need not process the data tuple any further. When the answer is not clear from the testing already performed, more testing is needed, and the tuple testing and routing operator sends in an asynchronous manner data tuples to the multiple parallel test operators. The tuple testing and routing operator can thus determine from the compiled results when a data tuples satisfies the pass criteria, or cannot satisfy the pass criteria even with additional processing, and can send the data tuple on to the appropriate PASS or FAIL operator, or may discard a failed data tuple, without requiring any additional testing of the data tuple. The tuple testing and routing operator thus provides a way to reduce the number of tests performed on data tuples to the minimum needed to make a determination of whether a data tuple satisfies the pass threshold or not. The result is that some of the data tuples are not processed by some of the multiple parallel test operators, which improves system performance when compared to an application such as 300 in FIG. 3 that requires each data tuple to be processed by each parallel test operator. Due to the differences in time for each of the parallel testing operators to perform their tests, the tuple testing and routing operator can route data tuples in an asynchronous matter to each of the parallel testing operators without regard to the processing state of the other parallel testing operators.

Figures 14, 15, 16:
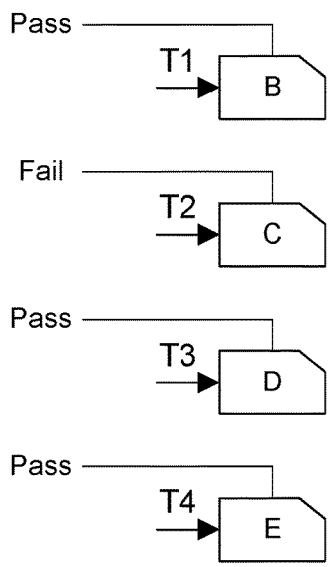
FIG. 14 is a table showing specified parameters that govern the function of the tuple testing and routing operator.
FIG. 15 is a partial flow diagram showing the testing of data tuples T1, T2, T3 and T4 using the four parallel operators shown in FIG. 4.
FIG. 16 is a table similar to the table in FIG. 7 after results of testing data tuples T1, T2, T3 and T4 in FIG. 15 have been compiled.
Figures 17, 18:
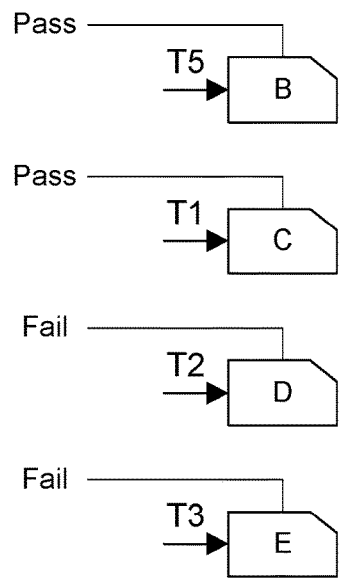
FIG. 17 is a partial flow diagram showing the testing of data tuples T5, T1, T2 and T3 using the four parallel operators shown in FIG. 4.
FIG. 18 is the table shown in FIG. 16 after the results of the testing in FIG. 17 have been compiled.

A second example uses the same parameters as shown in table 600 in FIG. 6, with the exception that the routing method has been changed from one data tuple per two operators to one data tuple per operator, as shown in table 1400 in FIG. 14. Using the parameters in table 1400 in the tuple testing and routing operator 410 in FIG. 4, the first four data tuples T1, T2, T3 and T4 are routed to the four parallel test operator B, C, D and E, as shown in FIG. 15. The results are shown in FIG. 15 and are compiled in table 1600 in FIG. 16. Note that a single test for each data tuple as shown in table 1600 is insufficient to determine whether the data tuple passes the specified 50% pass threshold, so processing of these four data tuples must continue. We assume the tuple testing and routing operator 410 then routes data tuple T5 to operator B, routes data tuple T1 to operator C, routes data tuple T2 to operator D, and routes data tuple T3 to operator E, as shown in FIG. 17, with the results as shown in FIG. 17 and as compiled in table 1800 in FIG. 18. Because data tuple T1 passed operators B and C, further testing with operators D and E are not needed, as indicated by the "X" in columns D and E for data tuple T1 in table 1800 in FIG. 18. This means the tuple testing and routing operator 410 can send data tuple T1 to the PASS operator F without routing data tuple T1 to parallel testing operators D and E. For the other data tuples T2, T3, T4 and T5 that have test results as shown in FIG. 18, no determination can be made regarding whether these data tuples satisfy the 50% pass threshold, so more testing is needed for each of these data tuples.

Figures 19, 20:
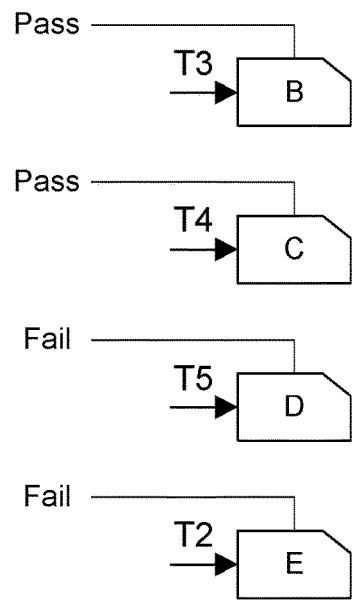
FIG. 19 is a partial flow diagram showing the testing of data tuples T3, T4, T5 and T2 using the four parallel operators shown in FIG. 4.
FIG. 20 is the table shown in FIG. 18 after the results of the testing in FIG. 19 have been compiled.

Next we assume the tuple testing and routing operator 410 sends data tuple T3 to operator B, send data tuple T4 to operator C, sends data tuple T5 to operator D, and sends data tuple T2 to operator E, as shown in FIG. 19, with the results as shown in FIG. 19 and compiled in table 2000 in FIG. 20. With the fail from operator E for data tuple T2, the tuple testing and routing operator 410 determines data tuple T2 does not satisfy the 50% pass threshold without needing to route data tuple T2 to operator B. Similarly, with the pass from operator B for T3, the tuple testing and routing operator 410 determines data tuple T3 satisfies the 50% pass threshold without needing to route data tuple T3 to operator C. Similarly, with the pass from operator C for data tuple T4, the tuple testing and routing operator 410 determines data tuple T4 satisfies the 50% pass threshold without needing to route data tuple T4 to operators B or D. With the information in table 2000, the tuple testing and routing operator 410 cannot make a determination regarding whether or not data tuple T5 meets the 50% pass criteria or not, so further testing is needed for data tuple T5. The routing of data tuples to the parallel test operators will continue for the remaining data tuples T5, T6, T7 and T8 in similar fashion to that described in detail above.

The Xs in FIG. 20 indicate the tests that did not have to be performed. These saved tests represent time that did not have to be spent testing tuples, and therefore represent a performance improvement for a system that includes the tuple testing and routing operator.

A tuple testing and routing operator in a streaming application routes data tuples to multiple parallel test operators that test in parallel the data tuples, receives feedback from the multiple parallel test operators regarding the results of testing the data tuples, routes a data tuple to a first operator when the data tuple passes the multiple parallel test operators according to a specified pass threshold, and optionally routes the data tuple to a second operator when the data tuple does not pass the multiple parallel test operators according to the specified pass threshold. The pass threshold allows testing to be done in a way that does not require all tests to be performed for all data tuples, thereby enhancing performance.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor; and
   a streaming application residing in the memory and executed by the at least one processor, the streaming application comprising a flow graph that includes a plurality of operators that process a plurality of data tuples, wherein the plurality of operators comprises:
   a plurality of parallel test operators that test in parallel the plurality of data tuples; and
   a tuple testing and routing operator that routes the plurality of data tuples to the plurality of parallel test operators, receives feedback from the plurality of parallel test operators regarding the results of testing the plurality of data tuples, and routes a first selected data tuple from the plurality of data tuples to a first operator when the first selected data tuple passes the plurality of parallel test operators according to a specified pass threshold;
   wherein the streaming application is executed under control of a streams manager and is configured by the streams manager according to a specified routing method that determines a number of the plurality of parallel test operators that operate in parallel on each of the plurality of data tuples.

2. The apparatus of claim 1 wherein the tuple testing and routing operator routes a second selected data tuple from the plurality of data tuples to a second operator when the second selected data tuple does not pass the plurality of parallel test operators according to the specified pass threshold.

3. The apparatus of claim 2 wherein the first operator comprises a pass operator and the second operator comprises a fail operator, wherein the tuple testing and routing operator routes the plurality of data tuples to the pass operator and the fail operator without processing each of the plurality of data tuples with all of the plurality of parallel test operators.

4. The apparatus of claim 1 wherein the pass threshold specifies a percentage that must be met or exceeded for each of the plurality of data tuples to pass the plurality of parallel test operators.

5. The apparatus of claim 1 wherein the tuple testing and routing operator routes the plurality of data tuples to the plurality of parallel test operators asynchronously as each of the plurality of parallel test operators becomes available based on the feedback according to which of the plurality of data tuples need to be processed by the plurality of parallel test operators.

6. The apparatus of claim 1 wherein the tuple testing and routing operator compiles results of testing the plurality of data tuples by the plurality of parallel test operators in a table to determine when each of the plurality of data tuples should be routed to the first operator or the second operator according to the specified pass threshold.

7. The apparatus of claim 6 wherein the tuple testing and routing operator determines from the compiled results in the table and from the specified pass threshold when a selected data tuple needs more tests by the plurality of parallel test operators, and routes the selected data tuple to at least one of the plurality of parallel test operators when the selected data tuple needs more tests.

8. The apparatus of claim 1 wherein the tuple testing and routing operator causes at least one of the plurality of parallel test operators to abort processing the first selected data tuple when the first selected data tuple passes the specified pass threshold.

9. A computer-implemented method executed by at least one processor for executing streaming applications, the method comprising:
   providing a streaming application comprising a first flow graph that includes a plurality of operators that process a plurality of data tuples, wherein the plurality of operators comprises:
   a plurality of parallel test operators that test in parallel the plurality of data tuples; and
   a tuple testing and routing operator that routes the plurality of data tuples to the plurality of parallel test operators, receives feedback from the plurality of parallel test operators regarding the results of testing the plurality of data tuples, and routes a first selected data tuple from the plurality of data tuples to a first operator when the first selected data tuple passes the plurality of parallel test operators according to a specified pass threshold;

defining at least one parameter that determines function of the tuple testing and routing operator; and executing the streaming application under control of a streams manager to process the plurality of data tuples according to the defined at least one parameter and according to a specified routing method that determines a number of the plurality of parallel test operators that operate in parallel on each of the plurality of data tuples.

10. The method of claim 9 further comprising routing a second selected data tuple from the plurality of data tuples to a second operator when the second selected data tuple does not pass the plurality of parallel test operators according to the specified pass threshold.

11. The method of claim 10 wherein the first operator comprises a pass operator and the second operator comprises a fail operator, wherein the tuple testing and routing operator routes the plurality of data tuples to the pass operator and the fail operator without processing each of the plurality of data tuples with all of the plurality of parallel test operators.

12. The method of claim 9 wherein the pass threshold specifies a percentage that must be met or exceeded for each of the plurality of data tuples to pass the plurality of parallel test operators.

13. The method of claim 9 wherein the tuple testing and routing operator routes the plurality of data tuples to the plurality of parallel test operators asynchronously as each of the plurality of parallel test operators becomes available based on the feedback according to which of the plurality of data tuples need to be processed by the plurality of parallel test operators.

14. The method of claim 9 wherein the tuple testing and routing operator compiles results of testing the plurality of data tuples by the plurality of parallel test operators in a table to determine when each of the plurality of data tuples should be routed to the first operator or the second operator according to the specified pass threshold.

15. The method of claim 14 wherein the tuple testing and routing operator determines from the compiled results in the table and from the specified pass threshold when a selected data tuple needs more tests by the plurality of parallel test operators, and routes the selected data tuple to at least one of the plurality of parallel test operators when the selected data tuple needs more tests.

16. The method of claim 9 wherein the tuple testing and routing operator causes at least one of the plurality of parallel test operators to abort processing the first selected data tuple when the first selected data tuple passes the specified pass threshold.

17. An apparatus comprising:
at least one processor;
a memory coupled to the at least one processor;
a streams manager residing in the memory and executed by the at least one processor, wherein the streams manager defines a routing method for processing a plurality of data tuples and a pass threshold that specifies a percentage that must be met or exceeded for each of the plurality of data tuples to pass, wherein the streams manager executes a streaming application residing in the memory, the streaming application comprising a flow graph that includes a plurality of operators that process a plurality of data tuples, wherein the plurality of operators comprises:
 a plurality of parallel test operators that test in parallel the plurality of data tuples; and
 a tuple testing and routing operator that routes the plurality of data tuples to the plurality of parallel test operators asynchronously as each of the plurality of parallel test operators becomes available according to the routing method and the pass threshold, receives feedback from the plurality of parallel test operators regarding the results of testing the plurality of data tuples, compiles results of testing the plurality of data tuples by the plurality of parallel test operators in a table, routes a first selected data tuple from the plurality of data tuples to a pass operator when the first selected data tuple passes the plurality of parallel test operators according to the pass threshold, and routes a second selected data tuple from the plurality of data tuples to a fail operator when the second selected data tuple does not pass the plurality of parallel test operators according to the pass threshold, wherein the tuple testing and routing operator routes the plurality of data tuples to the pass operator and the fail operator without processing each of the plurality of data tuples with all of the plurality of parallel test operators, wherein the tuple testing and routing operator causes at least one of the plurality of parallel test operators to abort processing the first selected data tuple when the first selected data tuple passes the specified pass threshold;
wherein the routing method determines a number of the plurality of parallel test operators that operate in parallel on each of the plurality of data tuples.

18. The apparatus of claim 17 wherein the tuple testing and routing operator determines from the compiled results in the table and from the pass threshold when a selected data tuple needs more tests by the plurality of parallel test operators, and routes the selected data tuple to at least one of the plurality of parallel test operators when the selected data tuple needs more tests.

* * * * *